(12) United States Patent
Shindo et al.

(10) Patent No.: US 12,220,616 B2
(45) Date of Patent: *Feb. 11, 2025

(54) GOLF BALL

(71) Applicant: Sumitomo Rubber Industries, Ltd., Kobe (JP)

(72) Inventors: Ayaka Shindo, Kobe (JP); Takahiro Shigemitsu, Kobe (JP); Kazuyoshi Shiga, Kobe (JP); Toshiyuki Tarao, Kobe (JP); Takanobu Kawamura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,589

(22) Filed: Apr. 21, 2023

(65) Prior Publication Data

US 2023/0338781 A1 Oct. 26, 2023

(30) Foreign Application Priority Data

Apr. 22, 2022 (JP) .................. 2022-070762

(51) Int. Cl.
*A63B 37/12* (2006.01)
*A63B 37/00* (2006.01)

(52) U.S. Cl.
CPC ...... *A63B 37/0074* (2013.01); *A63B 37/0024* (2013.01); *A63B 37/0031* (2013.01); *A63B 37/0036* (2013.01); *C08L 23/0876* (2013.01)

(58) Field of Classification Search
CPC .................................................. A63B 37/0023
See application file for complete search history.

(56) References Cited

U.S. PATENT DOCUMENTS

| | | | | |
|---|---|---|---|---|
| 6,739,987 B2* | 5/2004 | Harris | ................ | C08G 18/3225 473/378 |
| 6,776,729 B2* | 8/2004 | Harris | ................ | A63B 37/0003 473/378 |
| 7,135,529 B2* | 11/2006 | Sullivan | ............. | A63B 37/0003 473/378 |
| 7,534,834 B2* | 5/2009 | Onoda | ............... | A63B 37/0003 473/378 |
| 8,262,510 B2* | 9/2012 | Sullivan | ........... | A63B 37/00922 473/376 |
| 9,339,696 B2* | 5/2016 | Sullivan | ................. | C08K 5/101 |
| 11,975,242 B2* | 5/2024 | Shindo | ............... | A63B 37/0043 |
| 2003/0114624 A1 | 6/2003 | Harris et al. | | |
| 2018/0178080 A1 | 6/2018 | Tanaka et al. | | |

(Continued)

FOREIGN PATENT DOCUMENTS

JP 2004-283559 A 10/2004
JP 2007125178 A * 5/2007

(Continued)

*Primary Examiner* — Alvin A Hunter
(74) *Attorney, Agent, or Firm* — Birch, Stewart, Kolasch & Birch, LLP

(57) ABSTRACT

An object of the present disclosure is to provide a golf ball having good shot feeling and excellent durability while having non-lowered resilience. The present disclosure provides a golf ball comprising a spherical core and one or more cover layers disposed outside the spherical core, wherein at least one layer of the cover layers contains (A) a base resin and (B) a polyethylene oxide.

20 Claims, 1 Drawing Sheet

(56) References Cited

U.S. PATENT DOCUMENTS

| | | | |
|---|---|---|---|
| 2018/0178081 A1 | 6/2018 | Tanaka et al. | |
| 2023/0201670 A1* | 6/2023 | Shindo | A63B 37/0039 |
| | | | 473/376 |
| 2023/0338781 A1* | 10/2023 | Shindo | C08L 23/0876 |

FOREIGN PATENT DOCUMENTS

| | | |
|---|---|---|
| JP | 2018-102692 A | 7/2018 |
| JP | 2018-102694 A | 7/2018 |

* cited by examiner

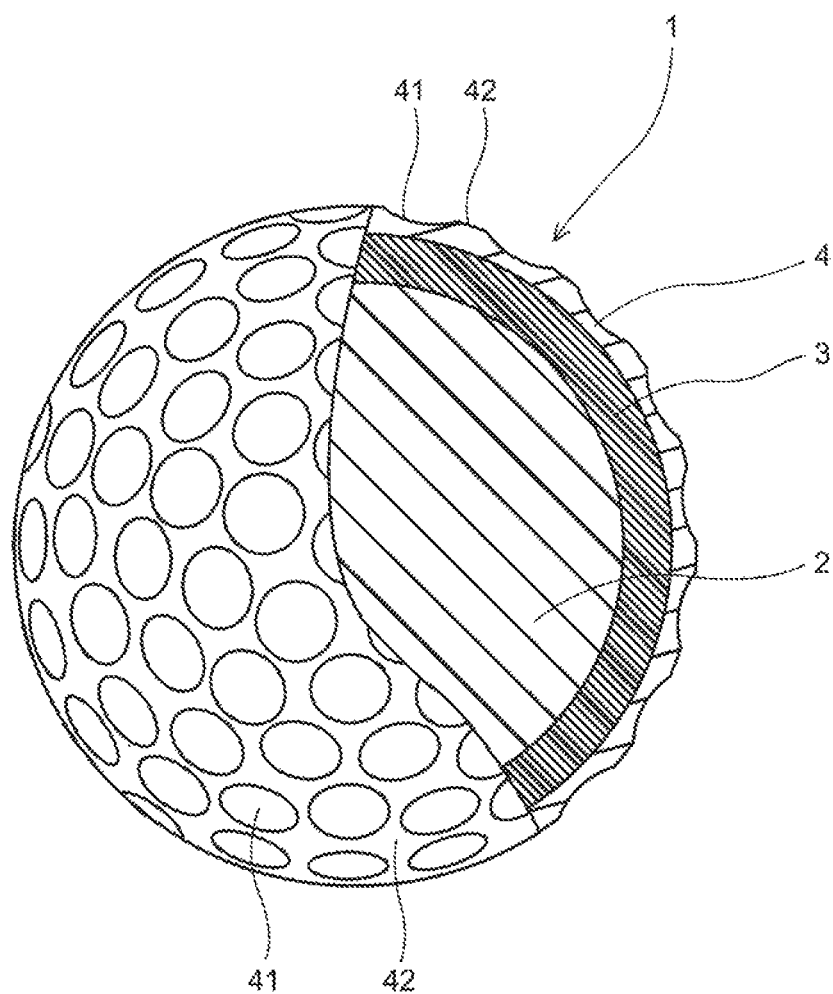

GOLF BALL

FIELD OF THE INVENTION

The present disclosure relates to a technology for improving a cover of a golf ball.

DESCRIPTION OF THE RELATED ART

As a resin component constituting a cover or intermediate layer of a golf ball, a thermoplastic resin such as an ionomer resin or a polyurethane is used. The ionomer resin is highly rigid, and when used as a constituent member of a golf ball, the resultant golf ball has high resilience and travels a great flight distance. Thus, the ionomer resin is widely used as a material of an intermediate layer or cover constituting a golf ball.

Further, for a golf ball, not only flight performance, but also various performances such as durability and shot feeling are also desired.

JP 2018-102692 A discloses a golf ball comprising a spherical core and one or more cover layers disposed outside the spherical core, wherein at least one layer of the cover layers contains:
(A) a base resin containing (a-1) an ionomer resin and having a material hardness of 59 or more in Shore D hardness; and
(B) a polyrotaxane having a cyclodextrin with at least a part of hydroxyl groups of the cyclodextrin being modified with a caprolactone chain via a —O—$C_3H_6$—O— group, a linear molecule piercing through a cyclic structure of the cyclodextrin, and blocking groups located at both terminals of the linear molecule to prevent disassociation of the cyclodextrin.

JP 2018-102694 A discloses a golf ball comprising a spherical core and one or more cover layers disposed outside the spherical core, wherein at least one layer of the cover layers contains:
(A) a base resin containing (a-1) an ionomer resin and having a material hardness of 58 or less in Shore D hardness; and
(B) a polyrotaxane having a cyclodextrin with at least a part of hydroxyl groups of the cyclodextrin being modified with a caprolactone chain via a —O—$C_3H_6$—O— group, a linear molecule piercing through a cyclic structure of the cyclodextrin, and blocking groups located at both terminals of the linear molecule to prevent disassociation of the cyclodextrin.

JP 2004-283559 A discloses a golf ball comprising: a core of at least one layer; a cover of at least one layer disposed concentrically about the core; and wherein at least one of the cover or the core is composed of a silicone-urea copolymer.

SUMMARY OF THE INVENTION

An object of the present disclosure is to provide a golf ball having good shot feeling and excellent durability without lowering resilience.

The present disclosure that has solved the above problem provides a golf ball comprising a spherical core and one or more cover layers disposed outside the spherical core, wherein at least one layer of the cover layers contains (A) a base resin and (B) a polyethylene oxide.

According to the present disclosure, a golf ball having good shot feeling and excellent durability without lowering resilience is obtained.

BRIEF DESCRIPTION OF THE DRAWINGS

The FIGURE is a partially cutaway cross-sectional view showing a golf ball according to one embodiment of the present disclosure.

DESCRIPTION OF THE PREFERRED EMBODIMENT

The present disclosure provides a golf ball comprising a spherical core and one or more cover layers disposed outside the spherical core, wherein at least one layer of the cover layers contains (A) a base resin and (B) a polyethylene oxide.

First, (A) the base resin and (B) the polyethylene oxide contained in the cover layer will be explained.

[(A) Base Resin]

(A) The base resin is not particularly limited, and may be either a thermoplastic resin or a thermosetting resin. The thermoplastic resin is preferable.

Examples of (A) the base resin include a thermoplastic resin such as an ionomer resin, a polyurethane, a polyamide, a polyolefin and a polyethylene; a thermoplastic elastomer such as a polyurethane elastomer, a styrene elastomer, a polyolefin elastomer, a polyamide elastomer and a polyester elastomer; a binary copolymer composed of an olefin and an α,β-unsaturated carboxylic acid having 3 to 8 carbon atoms, such as an ethylene-(meth) acrylic acid copolymer; and a ternary copolymer composed of an olefin, an α,β-unsaturated carboxylic acid having 3 to 8 carbon atoms and an α,β-unsaturated carboxylic acid ester, such as an ethylene-(meth) acrylic acid-(meth) acrylic acid ester copolymer.

(A) The base resin used in the present disclosure is preferably a relative hard resin. The material hardness of (A) the base resin is preferably 59 or more, more preferably 60 or more, and even more preferably 61 or more in Shore D hardness, and is preferably 69 or less, more preferably 68 or less, and even more preferably 67 or less in Shore D hardness. If the material hardness of (A) the base resin is 59 or more in Shore D hardness, the obtained golf ball has further enhanced resilience. In addition, if the material hardness of (A) the base resin is 69 or less in Shore D hardness, lowering in the durability due to repeated hitting can be further suppressed. It is noted that the material hardness of the base resin is a slab hardness obtained by measuring a sheet molded from the base resin.

It is preferable that (A) the base resin particularly contains the ionomer resin. In this case, the amount of the ionomer resin in (A) the base resin is preferably 40 mass % or more, more preferably 60 mass % or more, and even more preferably 80 mass % or more. If the amount is 40 mass % or more, the obtained golf ball has further enhanced resilience. It is noted that (A) the base resin also preferably consists of the ionomer resin.

Examples of the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

It is noted that, in the present disclosure, "an ionomer resin consisting of a metal ion-neutralized product of a binary copolymer composed of an olefin and an α,β-unsaturated carboxylic acid having 3 to 8 carbon atoms" is sometimes simply referred to as "a binary ionomer resin", and "an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "a ternary ionomer resin".

The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include a methyl ester, an ethyl ester, a propyl ester, a n-butyl ester, an isobutyl ester of acrylic acid, methacrylic acid, fumaric acid and maleic acid, and acrylic acid ester or methacrylic acid ester is particularly preferred.

As the binary ionomer resin, a metal ion-neutralized product of an ethylene-(meth)acrylic acid binary copolymer is preferable. As the ternary ionomer resin; a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary ionomer resin is preferably 5 mass % or more, more preferably 10 mass % or more, even more preferably 16 mass % or more, and most preferably 17 mass % or more; and is preferably 30 mass % or less, more preferably 25 mass % or less. This is because if the amount of the α,β-unsaturated carboxylic acid component having 3 to 8 carbon atoms is 5 mass % or more, the constituent member having a desirable hardness is easily obtained, and if the amount of the α,β-unsaturated carboxylic acid component having 3 to 8 carbon atoms is 30 mass % or less, the hardness of the obtained constituent member is not too high and thus the durability and the shot feeling of the golf ball are better.

The neutralization degree of the carboxyl groups of the binary ionomer resin is preferably 15 mole % or more, more preferably 20 mole % or more, and is preferably 90 mole % or less, more preferably 85 mole % or less. If the neutralization degree is 15 mole % or more, the obtained golf ball has better resilience and durability, and if the neutralization degree is 90 mole % or less, the cover material has better fluidity (better moldability). It is noted that the neutralization degree of the carboxyl groups of the binary ionomer resin may be calculated by the following expression.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of the binary ionomer resin include monovalent metal ions such as sodium, potassium and lithium; divalent metals ions such as magnesium, calcium, zinc, barium and cadmium; trivalent metals ions such as aluminum; and other ions such as tin and zirconium. As the binary ionomer resin, a mixture consisting of a sodium-neutralized binary ionomer resin and a zinc-neutralized binary ionomer resin is preferably used. Using the mixture further enhances the resilience and the durability.

Specific examples of the binary ionomer resin include trade names of "Himilan (registered trademark) (e.g. Himilan 1555 (Na), Himilan 1557 (Zn), Himilan 1605 (Na), Himilan 1702 (Zn), Himilan 1706 (Zn), Himilan 1707 (Na), Himilan AM7311 (Mg), Himilan AM7329 (Zn), Himilan AM7337 (Na))" available from Mitsui-Du Pont Polychemicals Co., Ltd.

Specific examples of the binary ionomer resin further include trade names of "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E. I. du Pont de Nemours and Company.

Specific examples of the binary ionomer resin further include trade names of "Iotek (registered trademark) (e.g. Iotek 8000 (Na), Iotek 8030 (Na), Iotek 7010 (Zn), Iotek 7030 (Zn))" available from ExxonMobil Chemical Corporation.

The above listed binary ionomer resin may be used solely, or at least two of them may be used in combination. It is noted that Na, Zn, Li, Mg and the like described in the parentheses after the trade names indicate metal types of neutralizing metal ions of the binary ionomer resins.

The bending stiffness of the binary ionomer resin is preferably 140 MPa or more, more preferably 150 MPa or more, and even more preferably 160 MPa or more, and is preferably 550 MPa or less, more preferably 500 MPa or less, and even more preferably 450 MPa or less. If the bending stiffness falls within the above range, the spin rate on driver shots is optimized and thus the flight performance is excellent, and the durability is also better.

The melt flow rate (190° C., 2.16 kgf) of the binary ionomer resin is preferably 0.1 g/10 min or more, more preferably 0.5 g/10 min or more, and even more preferably 1.0 g/10 min or more, and is preferably 30 g/10 min or less, more preferably 20 g/10 min or less, and even more preferably 15 g/10 min or less. If the melt flow rate (190° C., 2.16 kgf) of the binary ionomer resin is 0.1 g/10 min or more, the cover material has better fluidity, and thus, for example, a thin cover can be obtained. In addition, if the melt flow rate (190° C., 2.16 kgf) of the binary ionomer resin is 30 g/10 min or less, the obtained golf ball has better durability.

The amount of the α,β-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 90 mole % or less, more preferably 85 mole % or less. If the neutralization degree is 20 mole % or more, the obtained golf ball has better resilience and durability, and if the neutralization degree is 90 mole % or less, the cover material has better fluidity (better moldability). It is noted that the neutralization degree of the carboxyl groups of the ionomer resin may be calculated by the following expression.

Neutralization degree of ionomer resin (mole %)=100×(mole number of neutralized carboxyl groups in ionomer resin/mole number of all carboxyl groups in ionomer resin)

Examples of the metal ion for neutralizing at least a part of carboxyl groups of the ternary ionomer resin include monovalent metal ions such as sodium, potassium and lithium; divalent metals ions such as magnesium, calcium, zinc, barium and cadmium; trivalent metals ions such as aluminum; and other ions such as tin and zirconium.

Specific examples of the ternary ionomer resin include trade names of "Himilan (registered trademark) (e.g. Himilan AM7327 (Zn), Himilan 1855 (Zn), Himilan 1856 (Na), Himilan AM7331 (Na))" available from Mitsui-Du Pont Polychemicals Co., Ltd.; trade names of "Surlyn 6320 (Mg), Surlyn 8120 (Na), Surlyn 8320 (Na), Surlyn 9320 (Zn), Surlyn 9320W (Zn))" available from E. I. du Pont de Nemours and Company; and trade names of "Iotek 7510 (Zn), Iotek 7520 (Zn))" available from ExxonMobil Chemical Corporation. It is noted that Na, Zn, Mg and the like described in the parentheses after the trade names indicate metal types of neutralizing metal ions of the ternary ionomer resins. The ternary ionomer resin may be used solely, or at least two of them may be used in combination.

The bending stiffness of the ternary ionomer resin is preferably 10 MPa or more, more preferably 11 MPa or more, and even more preferably 12 MPa or more, and is preferably 100 MPa or less, more preferably 97 MPa or less, and even more preferably 95 MPa or less. If the bending stiffness falls within the above range, the spin rate on driver shots is optimized and thus the flight performance is excellent, and the durability is also better.

The melt flow rate (190° C., 2.16 kgf) of the ternary ionomer resin is preferably 0.1 g/10 min or more, more preferably 0.3 g/10 min or more, and even more preferably 0.5 g/10 min or more, and is preferably 20 g/10 min or less, more preferably 15 g/10 min or less, and even more preferably 10 g/10 min or less. If the melt flow rate (190° C., 2.16 kgf) of the ternary ionomer resin is 0.1 g/10 min or more, the cover material has better fluidity, and thus, for example, a thin constituent member can be obtained. In addition, if the melt flow rate (190° C., 2.16 kgf) of the ternary ionomer resin is 20 g/10 min or less, the obtained golf ball has better durability.

The melt flow rate (190° C., 2.16 kgf) of (A) the base resin is preferably 0.1 g/10 min or more, more preferably 0.3 g/10 min or more, and even more preferably 0.5 g/10 min or more, and is preferably 45 g/10 min or less, more preferably 40 g/10 min or less, and even more preferably 35 g/10 min or less. If the melt flow rate (190° C., 2.16 kgf) of (A) the base resin is 0.1 g/10 min or more, the cover material has better fluidity, and thus a thin constituent member can be obtained. In addition, if the melt flow rate (190° C., 2.16 kgf) of (A) the base resin is 45 g/10 min or less, the obtained golf ball has better durability.

[(B) Polyethylene Oxide]

(B) The polyethylene oxide is a polymer having oxyethylene ($-CH_2CH_2O-$) as a repeating unit. (B) The polyethylene oxide is finely dispersed in (A) the base resin, and enables to improve the durability and shot feeling of the obtained golf ball without lowering the resilience of the obtained golf ball.

As (B) the polyethylene oxide, for example, a product obtained by addition polymerization of ethylene oxide using, as an initiator, one or at least two compounds having at least two groups ($-NH-$ or $-OH$) with an active hydrogen atom, can be exemplified.

The initiator may be used solely, or at least two of them may be used in combination. Examples of the initiator include a compound having two hydroxy groups, such as ethylene glycol, diethylene glycol, triethylene glycol, propylene glycol, trimethylene glycol, 1,3-butanediol, 1,4-butanediol, 1,6-hexanediol, and bisphenol A; and a compound having three hydroxy groups, such as glycerin, trimethylolethane, and trimethylolpropane.

In the present disclosure, it is preferable that (B) the polyethylene oxide is a polymer obtained by ring opening polymerization of ethylene oxide, and has hydroxy groups at both terminals.

The number average molecular weight of (B) the polyethylene oxide is preferably 400 or more, more preferably 700 or more, even more preferably 1,000 or more, particularly preferably 3,000 or more, and most preferably 10,000 or more, and is preferably 7,000,000 or less, more preferably 6,000,000 or less, even more preferably 5,000,000 or less, particularly preferably 2,000,000 or less, and most preferably 1,000,000 or less. If the number average molecular weight of (B) the polyethylene oxide falls within the above range, the obtained golf ball strikes a better balance between the durability and the shot feeling.

The at least one layer of the cover layers of the golf ball according to the present disclosure is formed from a cover composition containing (A) the base resin and (B) the polyethylene oxide as a resin component. The cover layer containing (A) the base resin and (B) the polyethylene oxide contains (B) the polyethylene oxide preferably in an amount of 0.1 part by mass or more, more preferably in an amount of 0.5 part by mass or more, and even more preferably in an amount of 1.0 part by mass or more, and preferably in an amount of 30 parts by mass or less, more preferably in an amount of 20 parts by mass or less, and even more preferably in an amount of 10 parts by mass or less, with respect to 100 parts by mass of (A) the base resin. If the amount of (B) the polyethylene oxide is 0.1 part by mass or more, the obtained golf ball has further enhanced durability and shot feeling, and if the amount of (B) the polyethylene oxide is 30 parts by mass or less, the mold release property would not be affected when molding the golf ball.

In the case that the ionomer resin is used as (A) the base resin, the total amount of (A) the ionomer resin and (B) the polyethylene oxide relative to all the resin components in the cover layer is preferably 40 mass % or more, more preferably 60 mass % or more, and even more preferably 80 mass % or more. If the total amount is 40 mass % or more, the obtained golf ball has further enhanced resilience. The upper limit of the total amount is not particularly limited and is preferably 100 mass %.

[(C) Additive]

The cover layer containing (A) the base resin and (B) the polyethylene oxide may further contain (C) an additive, for example, a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or fluorescent brightener, or the like, unless they impair the performance of the cover.

In the present disclosure, the material hardness of the cover layer containing (A) the base resin and (B) the polyethylene oxide is preferably 59 or more, more preferably 60 or more, and even more preferably 61 or more in Shore D hardness, and is preferably 69 or less, more preferably 68 or less, and even more preferably 67 or less in Shore D hardness. If the material hardness is 59 or more in Shore D hardness, lowering in the resilience of the obtained golf ball can be suppressed. In addition, if the material hardness is 69 or less in Shore D hardness, the obtained golf ball has better shot feeling. It is noted that the material hardness of the cover layer containing (A) the base resin and (B) the polyethylene oxide is a slab hardness obtained by measuring a sheet molded from the cover composition containing (A) the base resin and (B) the polyethylene oxide.

In the case that the golf ball according to the present disclosure comprises a plurality of cover layers, at least one layer of the cover layers contains (A) the base resin and (B) the polyethylene oxide. In other words, in the case that the golf ball comprises a plurality of cover layers, examples of the embodiment of the cover layers include an embodiment in which all the cover layers contain (A) the base resin and (B) the polyethylene oxide; and an embodiment in which some layer of the cover layers contains (A) the base resin and (B) the polyethylene oxide, and other layers of the cover layers contain neither (A) the base resin nor (B) the polyethylene oxide. In this case, the outermost cover layer preferably contains (A) the base resin and (B) the polyethylene oxide. It is noted that in the case that two or more cover layers contain (A) the base resin and (B) the polyethylene oxide, the compositions of these cover layers may be identical to or different from each other.

The other layer of the cover layers (i.e. a cover layer not containing both of (A) the base resin and (B) the polyethylene oxide) preferably contains a resin component. The resin component contained in the other layer of the cover layers is not particularly limited, and examples thereof include the resin components exemplified as (A) the base resin. Specific examples of the resin component include an ionomer resin having a trade name of "Himilan (registered trademark)" available from Du Pont-Mitsui Polychemicals Co., Ltd., a thermoplastic polyurethane elastomer having a trade name of "Elastollan (registered trademark)" available from BASF Japan Ltd., a thermoplastic polyimide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Tefabloc" or a thermoplastic polyester elastomer having a trade name of "Tefabloc" available from Mitsubishi Chemical Corporation. It is noted that in the case that the other layer of the cover layers is composed of two or more layers, the compositions of each layer may be identical to or different from each other.

The other layer of the cover layers may further contain an additive, for example, a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or fluorescent brightener, or the like, unless they impair the performance of the cover.

The spherical core of the golf ball according to the present disclosure is preferably formed from a resin composition or a rubber composition, and more preferably formed from a rubber composition. The spherical core may be formed, for example, by heat pressing a rubber composition (hereinafter, sometimes simply referred to as "core rubber composition") containing a base rubber, a co-crosslinking agent, and a crosslinking initiator.

As the base rubber, particularly preferred is a high cis-polybutadiene having a cis-bond which is beneficial to the resilience in an amount of 40 mass % or more, preferably 70 mass % or more, and more preferably 90 mass % or more. As the co-crosslinking agent, an α,β-unsaturated carboxylic acid having 3 to 8 carbon atoms or a metal salt thereof is preferred, and an acrylic acid metal salt and an methacrylic acid metal salt are more preferred. As the metal constituting the metal salt, zinc, magnesium, calcium, aluminum and sodium are preferred, and zinc is more preferred. The amount of the co-crosslinking agent is preferably 15 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

The core rubber composition may further contain an organic sulfur compound. Examples of the organic sulfur compound include compounds of diphenyl disulfides (e.g. diphenyl disulfides, bis(pentabromophenyl) disulfides), thiophenols and thionaphthols. The amount of the organic sulfur compound is preferably 0.01 part by mass or more, more preferably 0.05 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, any one of an aliphatic carboxylic acid (e.g. caprylic acid) and an aromatic carboxylic acid (e.g. benzoic acid) may be used. The amount of the carboxylic acid and/or the salt thereof is 1 part by mass or more and 40 parts by mass or less with respect to 100 parts by mass of the base rubber.

The core rubber composition may appropriately contain a weight adjusting agent such as zinc oxide and barium sulfate, an antioxidant, or a colored powder, in addition to the base rubber, the co-crosslinking agent, the crosslinking initiator, and the organic sulfur compound.

[Construction of Golf Ball]

The construction of the golf ball according to the present disclosure is not particularly limited, as long as the golf ball comprises a spherical core and one or more cover layers covering the spherical core. Examples of the construction of the golf ball include a two-piece golf ball composed of a single-layered spherical core and a single-layered cover covering the spherical core wherein the single-layered cover contains (A) the base resin and (B) the polyethylene oxide; a three-piece golf ball composed of a single-layered spherical core, an inner cover layer covering the spherical core and an outer cover layer covering the inner cover layer wherein either or both of the inner cover layer and the outer cover layer contain (A) the base resin and (B) the polyethylene oxide; a multi-piece golf ball (e.g. a four-piece golf ball, a five-piece golf ball) composed of a single-layered spherical core, two or more inner cover layers covering the spherical core and an outermost cover layer covering the inner cover layers wherein at least one layer of the two or more inner cover layers contains (A) the base resin and (B) the polyethylene oxide; and a multi-piece golf ball (e.g. a four-piece golf ball, a five-piece golf ball) composed of a single-layered spherical core, two or more inner cover layers covering the spherical core and an outermost cover layer covering the inner cover layers wherein the outermost cover Dyer contains (A) the base resin and (B) the polyethylene oxide.

In the multi-piece golf ball (e.g. four-piece golf ball, five-piece golf ball) composed of a single-layered spherical core, two or more inner cover layers covering the spherical core and an outermost cover layer covering the inner cover layers wherein at least one layer of the two or more inner cover layers contains (A) the base resin and (B) the polyethylene oxide, the outermost layer of the inner cover layers preferably contains (A) the base resin and (B) the polyethylene oxide, and all layers of the inner cover layers may contain (A) the base resin and (B) the polyethylene oxide.

In the multi-piece golf ball (e.g. four-piece golf ball, five-piece golf ball) composed of a single-layered spherical core, two or more inner cover layers covering the spherical core and an outermost cover layer covering the inner cover layers wherein the outermost cover layer contains (A) the base resin and (B) the polyethylene oxide, at least one layer of the two or more inner cover layers may contain (A) the base resin and (B) the polyethylene oxide. In this case, the outermost layer of the inner cover layers preferably contains (A) the base resin and (B) the polyethylene oxide, and all layers of the inner cover layers may contain (A) the base resin and (B) the polyethylene oxide.

The spherical core of the golf ball according to the present disclosure preferably has a diameter of 37.0 mm or more, more preferably 37.5 mm or more, and even more preferably 38.0 mm or more, and preferably has a diameter of 42.2 mm or less, more preferably 41.8 mm or less, even more preferably 41.5 mm or less, and most preferably 41.0 mm or less. If the diameter of the spherical core is 37.0 mm or more, the thickness of the cover does not become too thick and thus the resilience becomes better. On the other hand, if the diameter of the spherical core is 42.2 mm or less, the thickness of the cover does not become too thin and thus the cover functions better.

When the spherical core has a diameter in a range from 37.0 mm to 42.2 mm, the compression deformation amount of the spherical core (shrinking amount of the spherical core along the compression direction) when applying a load from 98 N as an initial load to 1275 N as a final load to the spherical core is preferably 2.0 mm or more, more preferably 2.1 mm or more, and even more preferably 2.2 mm or more, and is preferably 5.0 mm or less, more preferably 4.9 mm or less, and even more preferably 4.8 mm or less. If the compression deformation amount is 2.0 mm or more, the shot feeling becomes better, and if the compression deformation amount is 5.0 mm or less, the resilience becomes higher.

The thickness of the cover of the golf ball according to the present disclosure is preferably 0.5 mm or more, more preferably 0.7 mm or more, and even more preferably 0.9 mm or more, and is preferably 4.0 mm or less, more preferably 3.0 mm or less, and even more preferably 2.0 mm or less. This is because if the thickness of the cover falls within the above range, lowering in the durability or abrasion resistance of the cover can be further suppressed. It is noted that when the cover has a plurality of layers, it is preferred that the total thickness of the cover layers falls within the above range.

In the case that the golf ball according to the present disclosure has two or more inner cover layers and the outermost cover layer, the total thickness of the inner cover layers is preferably 0.5 mm or more, more preferably 0.6 mm or more, and even more preferably 0.7 mm or more, and is preferably 4.0 mm or less, more preferably 3.5 mm or less, and even more preferably 3.0 mm or less. In addition, the thickness of each layer of the inner cover layers is preferably 0.3 mm or more, more preferably 0.4 mm or more, and even more preferably 0.5 mm or more, and is preferably 2.0 mm or less, more preferably 1.8 mm or less, and even more preferably 1.6 mm or less.

The thickness of the outermost cover layer is preferably 4.0 mm or less, more preferably 3.0 mm or less, and even more preferably 2.0 mm or less, and is preferably 0.3 mm or more, more preferably 0.4 mm or more, and even more preferably 0.5 mm or more. This is because if the thickness of the outermost cover layer falls within the above range, the obtained golf ball has better resilience or shot feeling.

The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimples is small. The shape (shape in a plan view) of the dimples includes, but is not limited to, a circle, a polygonal shape such as a roughly triangular shape, a roughly quadrangular shape, a roughly pentagonal shape and a roughly hexagonal shape, and other irregular shape. The shape of the dimples may be employed solely or at least two of them may be used in combination.

The golf ball according to the present disclosure preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, and particularly preferably 42.80 mm or less. In addition, the golf ball according to the present disclosure preferably has a mass in a range from 40 g to 50 g. In light of obtaining greater inertia, the mass is more preferably 44 g or more, and particularly preferably 45.00 g or more. In light of satisfying a regulation of USGA, the mass is particularly preferably 45.93 g or less.

When the golf ball according to the present disclosure has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less, and even more preferably 4.0 mm or less. If the compression deformation amount is 2.0 mm or more, the golf ball does not become too hard and thus the shot feeling thereof becomes better. On the other hand, if the compression deformation amount is 5.0 mm or less, the resilience of the golf ball becomes higher.

[Method for Producing Golf Ball]

The spherical core of the golf ball according to the present disclosure may be molded, for example, by heat pressing the spherical core rubber composition. The molding conditions for heat pressing the core rubber composition may be determined appropriately depending on the rubber formulation. Generally, the heat pressing is preferably carried out at the temperature ranging from 130° C. to 200° C. for 10 minutes to 60 minutes, or carried out in a two-step heating of heating at the temperature ranging from 130° C. to 150° C. for 20 to 40 minutes followed by heating at the temperature ranging from 160° C. to 180° C. for 5 to 15 minutes.

Examples of the method for molding the cover of the golf ball according to the present disclosure include a method which comprises molding the cover composition into a hollow shell, covering the core with a plurality of the hollow shells and subjecting the core with a plurality of the hollow shells to the compression molding (preferably a method which comprises molding the cover composition into a hollow half shell, covering the spherical core with two of the hollow half shells, and subjecting the spherical core with two of the hollow half shells to the compression molding); and a method which comprises injection molding the cover composition directly onto the spherical core. The cover of the golf ball according to the present disclosure is preferably molded by the injection molding method. This is because if the injection molding method is adopted, the cover can be produced more easily.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the spherical core with two of the half shells and then subjecting the spherical core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, for example, the hold pin is protruded to hold the core, and the cover composition is charged and cooled to obtain the cover. For example, the molding of the cover may be conducted as follows: the cover composition heated to a temperature ranging from 200° C. to 250° C. is charged for 0.5 second to 5 seconds into a mold held under a pressure of 9 MPa to 15 MPa, and cooled for 10 to 60 seconds, and the mold is opened to eject the golf ball.

In case of using an injection molding machine having an extruder and a mold to mold the cover, the temperature at the cylinder (barrel) portion of the extruder (setting temperature of the extruder) is preferably 200° C. or more, more preferably 210° C. or more, and is preferably 270° C. or less, more preferably 260° C. or less. If the temperature at the cylinder (barrel) portion falls within the above range, the fluidity of the cover composition can be maintained.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, and even more preferably 30 μm or less. This is because if the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The FIGURE is a partially cutaway cross-sectional view showing a golf ball 1 according to one embodiment of the present disclosure. The golf ball 1 comprises a spherical core 2, an inner cover layer 3 disposed outside the spherical core 2, and an outer cover layer 4 disposed outside the inner cover layer 3. A plurality of dimples 41 are formed on the surface of the outer cover layer 4. Other portion than the dimples 41 on the surface of the outer cover layer 4 is lands 42. In a preferable embodiment of the present disclosure, either or both of the outer cover layer 4 and the inner cover layer 3 contains (A) the base resin and (B) the polyethylene oxide.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Methods]
(1) Compression Deformation Amount (mm)

The deformation amount of the core along the compression direction (shrinking amount of the core along the compression direction), when applying a load from an initial load of 98 N to a final load of 1275 N to the core, was measured.

(2) Material HARDNESS (Shore D HARDNESS)

Sheets with a thickness of about 2 mm were produced by injection molding (cylinder temperature: 230° C.) the cover composition. The sheets were stored at the temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D". It is noted that when measuring the material hardness of the cover composition, a composition obtained by blending predetermined materials ((B) the polyethylene oxide, titanium dioxide and so on) into (A) the base resin is used for the measurement.

(3) Shot Feeling

An actual hitting test was carried out by using a driver by ten amateur golfers (high skilled persons). In accordance with the following grading criteria, the feeling of the golf ball at hitting was evaluated by each golfer. The shot feeling most evaluated by the ten golfers was adopted as the shot feeling of that golf ball.

Grading Criteria
E (Excellent): Impact is low and feeling is good.
G (Good): Impact is normal.
F (Fair): Impact is a little great and feeling is not good.
P (Poor): Impact is great and feeling is bad.

(4) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, the coefficient of restitution of each golf ball was calculated. The measurement was conducted using twelve samples for each golf ball, and the average value thereof was adopted as the coefficient of restitution for the golf ball. It is noted that the coefficient of restitution of the golf ball No. 9 was defined as 100, and the coefficient of restitution of each golf ball was represented by converting the coefficient of restitution of each golf ball into this index.

(5) Durability

A test was carried out by using an air gun to allow each golf ball to collide with a metal plate repeatedly at a speed of 45 m/sec, and the times of colliding were counted until when a crack occurred in the golf ball. Twelve samples for each golf ball were used in the test, and the average value thereof was adopted as the times of colliding for the golf ball. The durability of each golf ball was evaluated according to the following criteria.

Grading Criteria

E (Excellent): The times of colliding when a crack occurred in the golf ball is 95 or more.
G (Good): The times of colliding when a crack occurred in the golf ball is 85 or more and 94 or less.
F (Fair): The times of colliding when a crack occurred in the golf ball is 75 or more and 84 or less.
P (Poor): The times of colliding when a crack occurred in the golf ball s 74 or less.

[Production of Golf Ball]

(1) Production of Spherical Core

The rubber composition having the formulation shown in Table 1 was kneaded, and heat pressed in upper and lower molds, each having a hemispherical cavity, to produce a spherical core. It is noted that barium sulfate was appropriately added such that the obtained golf ball had a mass of 45.6 g.

TABLE 1

| | Rubber composition No. | A |
|---|---|---|
| Formulation (parts by mass) | Polybutadiene rubber | 100 |
| | Zinc acrylate | 32 |
| | Zinc oxide | 5 |
| | Barium sulfate | Appropriate amount* |
| | Dicumyl peroxide | 0.7 |
| | Diphenyldisulfide | 0.5 |
| Molding condition | Molding temperature (° C.) | 170 |
| | Molding time (min) | 15 |
| | Core diameter (mm) | 39.8 |
| | Compression deformation amount (mm) | 3.6 |

*As to the amount of barium sulfate, adjustment was made such that the golf ball had a mass of 45.6 g.
Polybutadiene rubber: "BR730 (high-cis polybutadiene)" available from JSR Corporation
Zinc acrylate: "ZNDA-90S" available from Nisshoku Techno Fine Chemical Co., Ltd.
Zinc oxide: "Ginrei (registered trademark) R" available from Toho Zinc Co., Ltd.
Barium sulfate: "Barium Sulfate BD" available from Sakai Chemical Industry Co., Ltd.
Dicumyl peroxide: "PERCUMYL (registered trademark) D" available from NOF Corporation
Diphenyldisulfide: available from Sumitomo Seika Chemicals Co., Ltd.

(2) Production of Cover

According to the formulations shown in Table 2, the cover compositions in a pellet form were prepared respectively by mixing the materials with a twin-screw kneading extruder. The extruding conditions for the cover compositions were a screw diameter of 45 mm, a screw rotational speed of 200 rpm and screw L/D=35, and the mixture was heated to 160° C. to 230° C. at the die position of the extruder.

When molding the cover, the hold pin was protruded to hold the spherical core, the cover composition heated to 260° C. was charged for 0.3 second into a mold held under a pressure of 80 tons, and cooled for 30 seconds, and the mold was opened to eject the golf ball. The surface of the obtained golf ball body was treated with sandblast and marked. After that, a clear paint was applied to the golf ball body, and dried in an oven at a temperature of 40° C. to obtain golf balls having a diameter of 42.7 mm and a mass of 45.6 g.

TABLE 2

| | | Golf ball No. | 1 | 2 | 3 | 4 | 5 | 6 |
|---|---|---|---|---|---|---|---|---|
| Spherical core | | Rubber composition No. | A | A | A | A | A | A |
| | | Diameter (mm) | 39.8 | 39.8 | 39.8 | 39.8 | 39.8 | 39.8 |
| | | Compression deformation amount (mm) | 3.6 | 3.6 | 3.6 | 3.6 | 3.6 | 3.6 |
| Cover | Formulation (parts by mass) | (A) Base resin Himilan 1555 | 30 | 30 | 30 | 30 | 30 | 30 |
| | | Himilan 1605 | 20 | 20 | 20 | 20 | 20 | 20 |
| | | Himilan AM7329 | 50 | 50 | 50 | 50 | 50 | 50 |
| | | Himilan AM7337 | — | — | — | — | — | — |
| | | Nucrel N1560 | — | — | — | — | — | — |
| | | Melt flow rate of (A) base resin*) | 6.1 | 6.1 | 6.1 | 6.1 | 6.1 | 6.1 |
| | | (B) Polyethylene oxide Polyethylene oxide 3350 | 5 | — | — | — | — | — |
| | | Polyethylene oxide 35000 | — | 2 | 5 | 10 | — | — |
| | | Polyethylene oxide 300000 | — | — | — | — | 5 | — |
| | | Polyethylene oxide 2000000 | — | — | — | — | — | 5 |
| | | Titanium dioxide | 3 | 3 | 3 | 3 | 3 | 3 |
| | Property | Thickness (mm) | 1.45 | 1.45 | 1.45 | 1.45 | 1.45 | 1.45 |
| | | Material hardness (Shore D) | 61 | 62 | 62 | 61 | 63 | 64 |
| Ball performance | | Coefficient of restitution | 100 | 100 | 100 | 100 | 100 | 100 |
| | | Shot feeling | E | E | E | E | G | F |
| | | Durability | G | G | E | G | E | E |

| | | Golf ball No. | 7 | 8 | 9 | 10 | 11 |
|---|---|---|---|---|---|---|---|
| Spherical core | | Rubber composition No. | A | A | A | A | A |
| | | Diameter (mm) | 39.8 | 39.8 | 39.8 | 39.8 | 39.8 |
| | | Compression deformation amount (mm) | 3.6 | 3.6 | 3.6 | 3.6 | 3.6 |
| Cover | Formulation (parts by mass) | (A) Base resin Himilan 1555 | — | — | 30 | — | — |
| | | Himilan 1605 | — | — | 20 | — | — |
| | | Himilan AM7329 | 25 | 50 | 50 | 25 | 50 |
| | | Himilan AM7337 | 25 | 50 | — | 25 | 50 |
| | | Nucrel N1560 | 50 | — | — | 50 | — |
| | | Melt flow rate of (A) base resin*) | 32.5 | 5 | 6.1 | 3.25 | 5 |
| | | (B) Polyethylene oxide Polyethylene oxide 3350 | — | — | — | — | — |

TABLE 2-continued

|  |  |  |  |  |  |  |
|---|---|---|---|---|---|---|
|  | Polyethylene oxide 35000 | 5 | 5 | — | — | — |
|  | Polyethylene oxide 300000 | — | — | — | — | — |
|  | Polyethylene oxide 2000000 | — | — | — | — | — |
|  | Titanium dioxide | 3 | 3 | 3 | 3 | 3 |
| Property | Thickness (mm) | 1.45 | 1.45 | 1.45 | 1.45 | 1.45 |
|  | Material hardness (Shore D) | 61 | 64 | 64 | 63 | 65 |
| Ball performance | Coefficient of restitution | 100 | 100 | 100 | 100 | 100 |
|  | Shot feeling | E | G | P | F | P |
|  | Durability | E | E | F | F | F |

*)Melt flow rate: g/10 min (190° C., 2.16 kgf)
Himilan 1555: sodium ion-neutralized ethylene-methacrylic acid binary copolymer ionomer resin (melt flow rate (190° C., 2.16 kgf): 10 g/10 min, bending stiffness: 240 MPa, material hardness: 60 (Shore D)) available from Du Pont-Mitsui Polychemicals Co., Ltd.
Himilan 1605: sodium ion-neutralized ethylene-methacrylic acid binary copolymer ionomer resin (melt flow rate (190° C., 2.16 kgf): 3 g/10 min, bending stiffness: 320 MPa, material hardness: 65 (Shore D)) available from Du Pont-Mitsui Polychemicals Co., Ltd.
Himilan AM7329: zinc ion-neutralized ethylene-methacrylic acid binary copolymer ionomer resin (melt flow rate (190° C., 2.16 kgf): 5 g/10 min, bending stiffness: 221 MPa, material hardness: 64 (Shore D)) available from Du Pont-Mitsui Polychemicals Co., Ltd.
Himilan AM7337: sodium ion-neutralized ethylene-methacrylic acid copolymer ionomer resin (melt flow rate (190° C., 2.16 kgf): 5 g/10 min, bending stiffness: 272 MPa, Shore D hardness: 64) available from Du Pont-Mitsui Polychemicals Co., Ltd.
Nucrel N1560: ethylene-methacrylic acid copolymer (melt flow rate (190° C., 2.16 kgf): 60 g/10 min, bending stiffness: 81 MPa, Shore D hardness: 55) available from Du Pont-Mitsui Polychemicals Co., Ltd.
Polyethylene oxide 3350: polyethylene oxide having a number average molecular weight of 3,350 available from Sigma-Aldrich Corporation
Polyethylene oxide 35000: polyethylene oxide having a number average molecular weight of 35,000 available from Sigma-Aldrich Corporation
Polyethylene oxide 300000: polyethylene oxide having a number average molecular weight of 300,000 available from Sigma-Aldrich Corporation
Polyethylene oxide 2000000: polyethylene oxide having a number average molecular weight of 2,000,000 available from Sigma-Aldrich Corporation
Titanium dioxide: "A220" available from Ishihara Sangyo Kaisha, Ltd.

The evaluation results regarding the obtained golf balls are shown in Table 2. It is apparent from the results shown in Table 2 that the golf ball according to the present disclosure that comprises a spherical core and one or more cover layers disposed outside the spherical core, wherein at least one layer of the cover layers contains (A) a base resin and (B) a polyethylene oxide, has good shot feeling and excellent durability without lowering resilience.

The golf ball according to the present disclosure has good shot feeling and excellent durability while having non-lowered resilience.

This application is based on Japanese Patent Application No. 2022-070762 filed on Apr. 22, 2022, the content of which is hereby incorporated by reference.

The golf ball according to the present disclosure (1) comprises a spherical core and one or more cover layers disposed outside the spherical core, wherein at least one layer of the cover layers contains (A) a base resin and (B) a polyethylene oxide.

The golf ball according to the present disclosure (2) is the golf ball according to the present disclosure (1), wherein an amount of (B) the polyethylene oxide is 0.1 part by mass or more and 30 parts by mass or less with respect to 100 parts by mass of (A) the base resin.

The golf ball according to the present disclosure (3) is the golf ball according to the present disclosure (1) or (2), wherein (B) the polyethylene oxide has a number average molecular weight of 400 or more and 7,000,000 or less.

The golf ball according to the present disclosure (4) is the golf ball according to any one of the present disclosures (1) to (3), wherein the cover layer containing (A) the base resin and (B) the polyethylene oxide has a material hardness ranging from 59 to 69 in Shore D hardness.

The golf ball according to the present disclosure (5) is the golf ball according to any one of the present disclosures (1) to (4), wherein (A) the base resin contains an ionomer resin.

The golf ball according to the present disclosure (6) comprises a spherical core and one or more cover layers disposed outside the spherical core, wherein at least one layer of the cover layers contains: (A) a base resin containing an ionomer resin, and (B) a polyethylene oxide having a number average molecular weight of 400 or more and 7,000,000 or less, and an amount of (B) the polyethylene oxide is 0.1 part by mass or more and 30 parts by mass or less with respect to 100 parts by mass of (A) the base resin.

The golf ball according to the present disclosure (7) is the golf ball according to any one of the present disclosures (1) to (6), wherein an outermost cover layer contains (A) the base resin and (B) the polyethylene oxide.

The invention claimed is:

1. A golf ball comprising a spherical core and one or more cover layers disposed outside the spherical core, wherein at least one layer of the cover layers contains (A) a base resin and (B) a polyethylene oxide.

2. The golf ball according to claim 1, wherein an amount of (B) the polyethylene oxide is 0.1 part by mass or more and 30 parts by mass or less with respect to 100 parts by mass of (A) the base resin.

3. The golf ball according to claim 1, wherein an amount of (B) the polyethylene oxide is 1.0 part by mass or more and 10 parts by mass or less with respect to 100 parts by mass of (A) the base resin.

4. The golf ball according to claim 1, wherein (B) the polyethylene oxide has a number average molecular weight of 400 or more and 7,000,000 or less.

5. The golf ball according to claim 1, wherein the cover layer containing (A) the base resin and (B) the polyethylene oxide has a material hardness ranging from 59 to 69 in Shore D hardness.

6. The golf ball according to claim 1, wherein (A) the base resin contains an ionomer resin.

7. The golf ball according to claim 1, wherein (A) the base resin consists of an ionomer resin.

8. The golf ball according to claim 1, wherein (A) the base resin has a material hardness ranging from 59 to 69 in Shore D hardness.

9. The golf ball according to claim 1, wherein an outermost cover layer contains (A) the base resin and (B) the polyethylene oxide.

10. A golf ball comprising a spherical core and one or more cover layers disposed outside the spherical core, wherein at least one layer of the cover layers contains:
(A) a base resin containing an ionomer resin, and (B) a polyethylene oxide having a number average molecular weight of 400 or more and 7,000,000 or less, and an amount of (B) the polyethylene oxide is 0.1 part by mass or more and 30 parts by mass or less with respect to 100 parts by mass of (A) the base resin.

11. The golf ball according to claim 10, wherein an outermost cover layer contains (A) the base resin and (B) the polyethylene oxide.

12. The golf ball according to claim 11, wherein (A) the base resin consists of an ionomer resin.

13. The golf ball according to claim 12, wherein (A) the base resin has a material hardness ranging from 59 to 69 in Shore D hardness.

14. The golf ball according to claim 13, wherein (A) the base resin has a melt flow rate (190° C., 2.16 kgf) of 0.1 g/10 min or more and 45 g/10 min or less.

15. A golf ball comprising a spherical core and one or more cover layers disposed outside the spherical core, wherein at least one layer of the cover layers contains (A) a base resin and (B) a polyethylene oxide, and (A) the base resin has a melt flow rate (190° C., 2.16 kgf) of 0.1 g/10 min or more and 45 g/10 min or less.

16. The golf ball according to claim 15, wherein an amount of (B) the polyethylene oxide is 0.1 part by mass or more and 30 parts by mass or less with respect to 100 parts by mass of (A) the base resin.

17. The golf ball according to claim 15, wherein (B) the polyethylene oxide has a number average molecular weight of 400 or more and 7,000,000 or less.

18. The golf ball according to claim 15, wherein the cover layer containing (A) the base resin and (B) the polyethylene oxide has a material hardness ranging from 59 to 69 in Shore D hardness.

19. The golf ball according to claim 15, wherein (A) the base resin contains an ionomer resin.

20. The golf ball according to claim 15, wherein an outermost cover layer contains (A) the base resin and (B) the polyethylene oxide.

* * * * *